Jan. 19, 1943. T. BACKUS 2,308,852
TRANSMISSION CASING
Filed Aug. 28, 1941
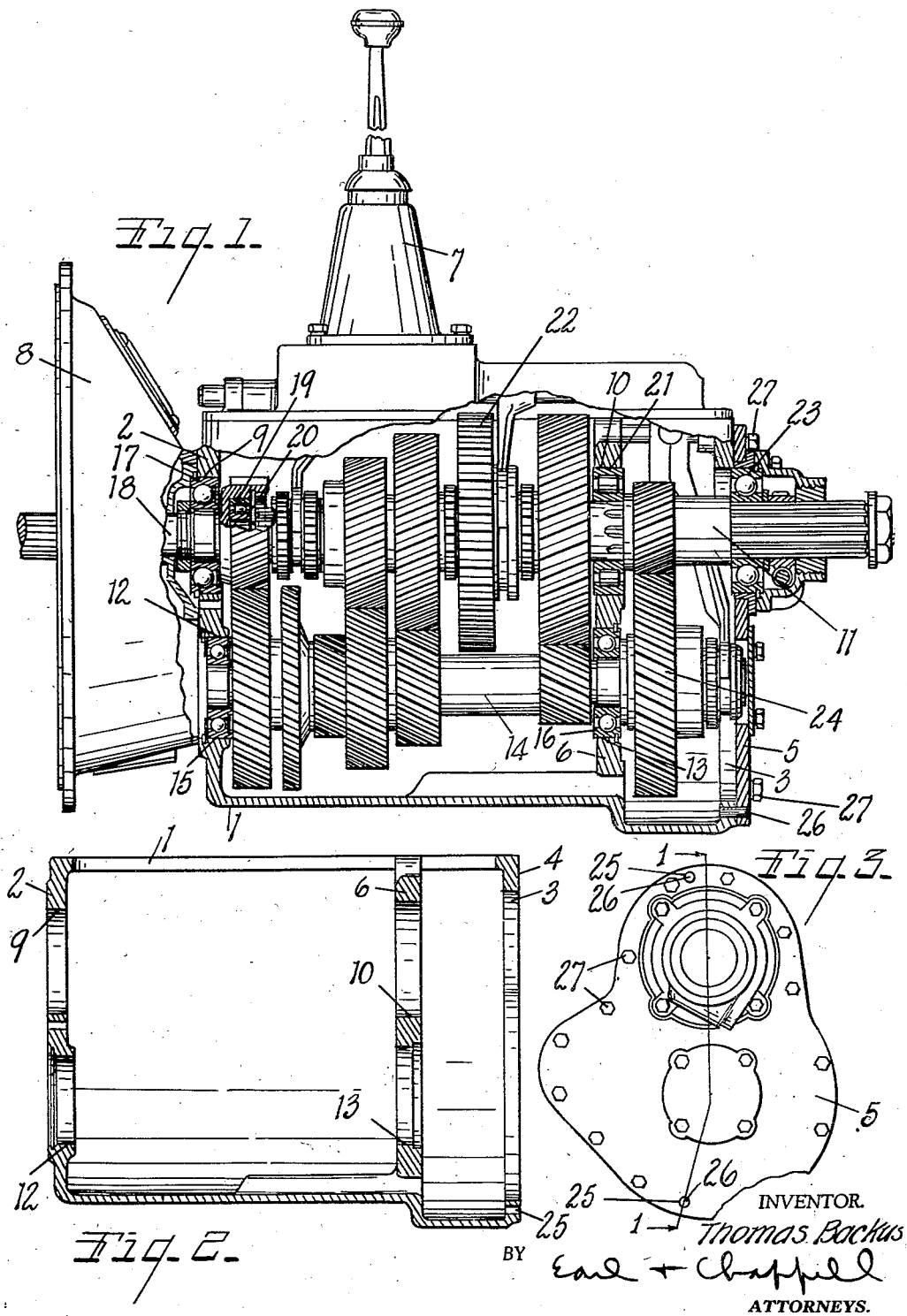
INVENTOR.
Thomas Backus
BY Earl + Chappell
ATTORNEYS.

Patented Jan. 19, 1943

2,308,852

UNITED STATES PATENT OFFICE 2,308,852

TRANSMISSION CASING

Thomas Backus, Kalamazoo, Mich., assignor to Fuller Manufacturing Company, Kalamazoo, Mich.

Application August 28, 1941, Serial No. 408,590

3 Claims. (Cl. 308—22)

This invention relates to improvements in transmission casings.

This invention relates to change-speed transmission casings. It has for its objects:

First, to provide a new and improved transmission casing.

Second, to provide such a casing in which an intermediate wall shortens the distance between bearings which permits the mounting of gears and shafts in a compact relationship to eliminate deflection and thereby permit the reduction in size of the various elements of the transmission.

Third, to provide such a transmission casing in which three bearings are provided for the main shaft and in which these three bearings may be readily and inexpensively alined.

Fourth, to provide such a transmission casing which permits easy assembly of the gears and shafts, particularly those for additional speeds over and above the conventional forward speeds.

Other objects and advantages pertaining to details and economies of construction and operation will appear from the description to follow. The invention is defined in the claims. A preferred embodiment of my invention is illustrated in the accompanying drawing, in which:

Fig. 1 is an elevational view partly in section showing a transmission with my new and improved casing, taken on line 1—1 of Fig. 3.

Fig. 2 is a longitudinal sectional view of my improved casing.

Fig. 3 is an end view partially broken away of a transmission employing my improved casing.

The improved casing 1 has a closed end 2 and an open end 3 which has a flat face 4 adapted to receive a transversely disposed flat plate 5. Spaced from the open end of the casing is a partition 6 which extends transversely of the casing. The casing is provided with a usual shifting tower 7 and has a portion of the clutch housing 8 mounted thereon. In the closed end of the casing, I provide a bore 9 and in the partition 6 an alined bore 10. In the manufacture of the casing, these bores may be alined to receive bearing means, to be later described, for supporting the main shaft 11. Bores 12 and 13 in the closed end 2 and the partition 6 respectively are provided for supporting the countershaft 14 by means of suitable bearings 15 and 16 which are fitted in said bores.

Bearing means for the forward end of the main shaft of the transmission are mounted in the bore 9. These comprise bearing 17 for the input shaft 18 which is bored as shown at 19 to provide a pilot bearing for the end 20 of the main shaft. A bearing 21 alined with the bearing means for the end of the main shaft is provided in the bore 10 of the partition 6. The main shaft 11 and the countershaft 14 are provided with the usual gears indicated generally at 22 which will not be described in detail since they form no part of this invention.

In the plate 5, I provide further main shaft bearing means 23 adapted to be alined with the other main shaft bearing means in the closed end 2 of the casing and in the partition 6. Because of the manufacturing difficulties involved in aligning three bearings, I mount these bearing means 23 in the plate 5 which can be adjusted transversely of the casing by sliding on the face 4 at the open end 3 of the casing. When the tranmission is assembled, the input shaft 18 is supported in its bearing by a suitable fixture in the manner in which it would be supported in use. The main shaft 11 with its gears is then inserted and is supported by the front end bearing means and the bearing means 21 in the partition 6. The gears 24 beyond the partition are then assembled and the plate 5 is placed on the face 4 of the open end 3 of the casing with its bearing means 23 embracing the shaft 11. The shaft supported in the bearing means of the closed end of the casing and the partition thus serves to aline the bearing means on the plate 5 with the other bearing means. The position of the plate 5 being thus established, the plate is drilled as indicated at 25 and doweled with dowels 26 in position. It is then clamped in place by means of bolts 27 which extend into and are tapped in the casing. There is sufficient clearance between the bolts and the holes of plate 5 through which they pass to permit the necessary transverse adjustment of the plate to give proper bearing alinement.

By employing my casing, it is possible to have three main shaft bearings and it is possible to aline them easily. The span between bearing members is relatively short so that deflection of the shafts is reduced, making it possible to use smaller shafts. The length of the casing closed by the plate 5 is materially less than would be the case with a conventional casing. It is possible to assemble an additional speed with the gears 24 between the partition 6 and the plate 5 and to save approximately three inches of length over and above conventional transmission length for a similar transmission, since these gears can be assembled before the plate 5 is positioned and fastened in place.

The terms and expressions which have been herein employed are used as terms of description and not of limitation, and there is no intention, in the use of such terms and expressions, of excluding any equivalents of the features shown and described, or portions thereof. It is recognized that various modifications are possible within the scope of the invention claimed.

Having thus described my invention, what I claim as new and desire to secure by Letters Patent is:

1. A transmission casing having a closed end and an open end, a transverse partition spaced inwardly from said open end, main shaft bearing means supported at the closed end of said casing, main shaft bearing means supported at said partition alined with said first mentioned main shaft bearing means, a plate adapted to close the open end of said casing, main shaft bearing means on said plate, a main shaft engaging all of said main shaft bearing means for support thereby, said plate being movable transversely of the open end of said casing for alining the main shaft bearing means on said plate with the aforesaid main shaft bearing means when said shaft is supported in the bearing means at the closed end of said casing and said bearing means at said partition, and means for anchoring said plate in adjusted position across the open end of said casing.

2. A transmission casing having a closed end and an open end, a transverse partition spaced inwardly from said open end, bearing means in the closed end of said casing, bearing means in said partition alined with said first mentioned bearing means, a plate adapted to close the end of said casing, bearing means in said plate, a shaft engaging all of said bearing means for support thereby, said plate being movable transversely of the open end of said casing for alining the bearing means in said plate with the aforesaid bearing means when said shaft is supported in the bearing means at the closed end of said casing and said bearing means at said partition, and means for anchoring said plate in adjusted position across the open end of said casing.

3. A transmission casing having a closed end and an open end, said open end having a flat transverse face, a transverse partition spaced inwardly from said open end, bearing means at the closed end of said casing, bearing means at said partition and alined with said first mentioned bearing means, a flat plate adapted to engage the flat face at the open end of said casing, bearing means on said plate, a shaft engaging all of said bearing means for support thereby, said plate being movable transversely of the open end of said casing for alining the bearing means thereon with said first mentioned bearing means when said shaft is supported in the bearing means at the closed end of said casing and said bearing means at said partition, and means for clamping said plate in adjusted position on the face at the open end of said casing.

THOMAS BACKUS.